(12) United States Patent
Goikhman et al.

(10) Patent No.: US 10,048,893 B2
(45) Date of Patent: Aug. 14, 2018

(54) CLOCK/POWER-DOMAIN CROSSING CIRCUIT WITH ASYNCHRONOUS FIFO AND INDEPENDENT TRANSMITTER AND RECEIVER SIDES

(71) Applicant: Apple Inc., Cupertino, CA (US)

(72) Inventors: Mark Goikhman, Haifa (IL); Tzach Zemer, Haifa (IL)

(73) Assignee: APPLE INC., Cupertino, CA (US)

( * ) Notice: Subject to any disclaimer, the term of this patent is extended or adjusted under 35 U.S.C. 154(b) by 207 days.

(21) Appl. No.: 14/706,076

(22) Filed: May 7, 2015

(65) Prior Publication Data
US 2016/0328182 A1   Nov. 10, 2016

(51) Int. Cl.
| | |
|---|---|
| H05K 7/10 | (2006.01) |
| G06F 13/00 | (2006.01) |
| G06F 13/28 | (2006.01) |
| G06F 1/12 | (2006.01) |
| G06F 13/42 | (2006.01) |
| H04L 5/00 | (2006.01) |
| H04L 7/00 | (2006.01) |
| G06F 3/00 | (2006.01) |
| G06F 5/00 | (2006.01) |
| G06F 13/36 | (2006.01) |
| G06F 3/06 | (2006.01) |
| G06F 13/40 | (2006.01) |

(52) U.S. Cl.
CPC ............ *G06F 3/0656* (2013.01); *G06F 3/061* (2013.01); *G06F 3/0688* (2013.01); *G06F 13/4027* (2013.01)

(58) Field of Classification Search
CPC . H04L 7/005; H04L 47/30; G06F 1/12; G06F 13/1689; G06F 5/12; G06F 5/14; G06F 2205/102; G06F 5/06; G06F 5/10; G06F 1/10; G06F 13/4059
USPC .............. 710/52, 57, 61, 301, 310; 711/167; 713/400, 500
See application file for complete search history.

(56) References Cited

U.S. PATENT DOCUMENTS

| | | | | |
|---|---|---|---|---|
| 6,028,789 | A * | 2/2000 | Mehta | G11C 16/0441 257/318 |
| 6,492,854 | B1 * | 12/2002 | Ku | H03K 3/012 327/202 |
| 6,553,448 | B1 * | 4/2003 | Mannion | G06F 5/10 341/98 |

(Continued)

OTHER PUBLICATIONS

Cadence Design Systems, Inc., "Clock Domain Crossing—Closing the Loop on Clock Domain Functional Implementation Problems", Technical Paper, 15 pages, Dec. 8, 2004.

*Primary Examiner* — Faisal M Zaman
(74) *Attorney, Agent, or Firm* — D. Kligler IP Services Ltd.

(57) ABSTRACT

An electronic circuit includes transmit-side circuitry and receive-side circuitry. The transmit-side circuitry belongs to a first domain of the circuit and is configured to transmit a data signal from the first domain to a second domain of the circuit. The receive-side circuitry belongs to the second domain and is configured to receive the transmitted data signal. The receive-side circuitry is configured to transfer to the transmit-side circuitry a read pointer value indicative of a readout position in a buffer memory that buffers the data signal, and to retain the read pointer value in a non-volatile element that is accessible to the transmit-side circuitry.

20 Claims, 3 Drawing Sheets

(56) References Cited

U.S. PATENT DOCUMENTS

| | | | | |
|---|---|---|---|---|
| 7,391,250 B1* | 6/2008 | Chuang | H03K 3/0375 | 326/104 |
| 7,570,534 B2* | 8/2009 | Wang | G06F 5/065 | 365/189.12 |
| 7,796,062 B1* | 9/2010 | Rangavajjhala | H03M 7/16 | 341/96 |
| 7,873,762 B2* | 1/2011 | Wang | G06F 5/14 | 375/376 |
| 7,908,500 B2* | 3/2011 | Westwick | G06F 1/3203 | 327/202 |
| 8,271,226 B2* | 9/2012 | Chakravadhanula | G01R 31/318575 | 702/117 |
| 8,352,819 B2* | 1/2013 | Flynn | G06F 11/2236 | 714/746 |
| 8,589,729 B1* | 11/2013 | Pritchard | G06F 11/1441 | 714/14 |
| 8,713,277 B2* | 4/2014 | Lilly | G06F 13/1668 | 710/52 |
| 9,383,923 B1* | 7/2016 | Malina | G06F 3/0608 | |
| 9,411,722 B2* | 8/2016 | Yap | G06F 12/0246 | |
| 9,711,196 B2* | 7/2017 | Bartling | G06F 11/1032 | |
| 2004/0051574 A1* | 3/2004 | Ko | G11C 14/00 | 327/218 |
| 2004/0230887 A1* | 11/2004 | Sellen | B42D 15/00 | 715/209 |
| 2005/0027966 A1* | 2/2005 | Hu | G06F 8/65 | 712/36 |
| 2005/0218952 A1* | 10/2005 | Padhye | G11C 5/147 | 327/218 |
| 2006/0197571 A1* | 9/2006 | Kim | G01B 31/31854 | 327/218 |
| 2006/0267654 A1* | 11/2006 | Gururajarao | H03K 3/356008 | 327/208 |
| 2006/0277329 A1* | 12/2006 | Paulson | G06F 5/10 | 710/39 |
| 2008/0086667 A1* | 4/2008 | Chen | G01R 31/31716 | 714/731 |
| 2008/0165608 A1* | 7/2008 | Choi | G11C 5/145 | 365/228 |
| 2008/0315931 A1* | 12/2008 | Maeda | H03K 3/012 | 327/198 |
| 2009/0058485 A1* | 3/2009 | Berzins | H03K 3/356008 | 327/203 |
| 2010/0001774 A1* | 1/2010 | Djaja | H03K 3/012 | 327/202 |
| 2010/0264735 A1* | 10/2010 | Yamaoka | G06F 1/32 | 307/43 |
| 2011/0004813 A1* | 1/2011 | Chandra | G01R 31/31726 | 714/798 |
| 2011/0055351 A1* | 3/2011 | Boldyrev | G06Q 10/10 | 709/219 |
| 2011/0099338 A1* | 4/2011 | Binz | G06F 12/0246 | 711/154 |
| 2011/0138107 A1* | 6/2011 | Sendlein | G07C 5/0858 | 711/103 |
| 2012/0112827 A1* | 5/2012 | Nishi | G06F 17/505 | 327/564 |
| 2012/0286858 A1* | 11/2012 | Biggs | H01L 27/0207 | 327/565 |
| 2013/0043983 A1* | 2/2013 | Lee | G06K 1/18 | 340/10.51 |
| 2013/0226486 A1* | 8/2013 | Henderson | G01R 31/3606 | 702/63 |
| 2014/0167828 A1* | 6/2014 | Yang | H03K 3/0375 | 327/202 |
| 2014/0351098 A1* | 11/2014 | Shafer | G06Q 10/087 | 705/28 |
| 2015/0201880 A1* | 7/2015 | Bureau | A61M 37/0015 | 600/301 |
| 2015/0371705 A1* | 12/2015 | Onkaraiah | G11C 13/0007 | 327/208 |
| 2016/0065188 A1* | 3/2016 | Singhal | H03K 3/35625 | 327/203 |
| 2016/0232968 A1* | 8/2016 | August | G11C 11/161 | |

\* cited by examiner

CLOCK/POWER-DOMAIN CROSSING CIRCUIT WITH ASYNCHRONOUS FIFO AND INDEPENDENT TRANSMITTER AND RECEIVER SIDES

TECHNICAL FIELD

Embodiments described herein relate generally to digital circuit design, and particularly to methods and systems for clock-domain and power-domain crossing.

BACKGROUND

Complex Integrated Circuits (ICs) such as Systems-on-Chip (SoC) are often partitioned into multiple clock domains and/or multiple power domains. In practice, it is sometimes necessary to transfer signals from one clock or power domain to another. Various techniques for clock-domain and power-domain crossing are known in the art. Example Clock-Domain Crossing (CDC) techniques are described, for example, in a Cadence whitepaper entitled "Clock Domain Crossing—Closing the Loop on Clock Domain Functional Implementation Problems," December, 2004, which is incorporated herein by reference.

SUMMARY

An embodiment that is described herein provides an electronic circuit including transmit-side circuitry and receive-side circuitry. The transmit-side circuitry belongs to a first domain of the circuit and is configured to transmit a data signal from the first domain to a second domain of the circuit. The receive-side circuitry belongs to the second domain and is configured to receive the transmitted data signal. The receive-side circuitry is configured to transfer to the transmit-side circuitry a read pointer value indicative of a readout position in a buffer memory that buffers the data signal, and to retain the read pointer value in a non-volatile element that is accessible to the transmit-side circuitry.

In some embodiments, the read pointer value is accessible to the transmit-side circuitry regardless of whether the receive-side circuitry is active or inactive. In an embodiment, the transmit-side circuitry is configured to write the data signal to the buffer memory while the receive-side circuitry is inactive. In another embodiment, the transmit-side circuitry is configured to verify, using the read pointer value retained in the non-volatile element of the receive-side circuitry, that the buffer memory is not full.

In some embodiments, the transmit-side circuitry is configured to transfer to the receive-side circuitry a write pointer value indicative of a writing position in the buffer memory, and to retain the write pointer value in a second non-volatile element that is accessible to the receive-side circuitry. In an example embodiment, the write pointer value is accessible to the receive-side circuitry regardless of whether the transmit-side circuitry is active or inactive.

In a disclosed embodiment, the receive-side circuitry is configured to read the data signal from the buffer memory while the transmit-side circuitry is inactive. In another embodiment, the receive-side circuitry is configured to verify, using the write pointer value retained in the second non-volatile element of the transmit-side circuitry, that the buffer memory is not empty. In yet another embodiment, the non-volatile element and the second non-volatile element each includes a Flip-Flop (FF) coupled to a latch isolator, or a retention FF.

In some embodiments, the first and second domains include respective different clock domains of the circuit. Typically, no clock signal is transferred between the transmit-side circuitry and the receive-side circuitry. In some embodiments, the first and second domains include respective different power domains of the circuit.

There is additionally provided, in accordance with an embodiment that is described herein, a method including transmitting a data signal from a first domain to a second domain of a circuit using transmit-side circuitry belonging to a first domain. The transmitted data signal is received using receive-side circuitry belonging to the second domain. A read pointer value, indicative of a readout position in a buffer memory that buffers the data signal, is transferred from the receive-side circuitry to the transmit-side circuitry. The read pointer value is retained in the receive-side circuitry in a non-volatile element that is accessible to the transmit-side circuitry.

These and other embodiments will be more fully understood from the following detailed description of the embodiments thereof, taken together with the drawings in which:

DETAILED DESCRIPTION OF EMBODIMENTS

Overview

Figure 1:
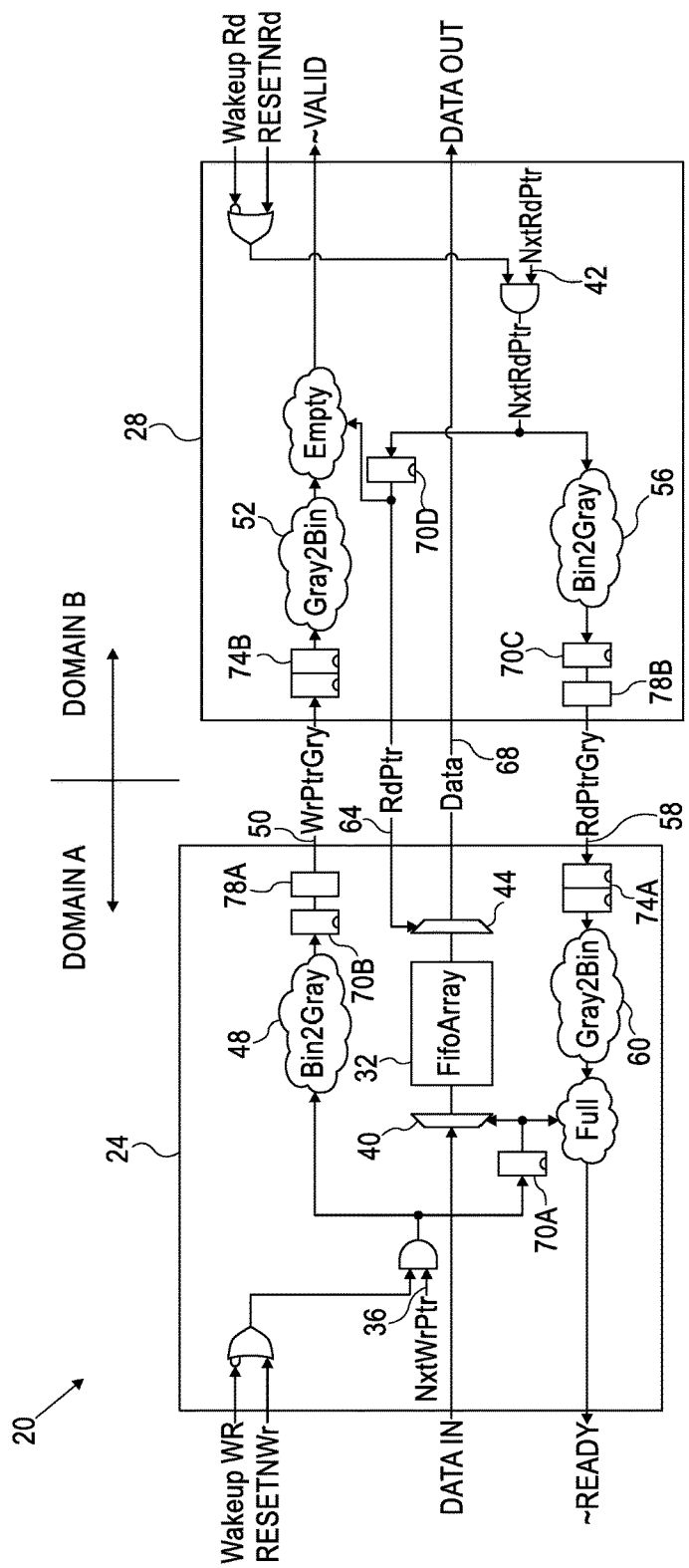
FIG. 1 is a block diagram that schematically illustrates a domain-crossing circuit, in accordance with an embodiment that is described herein.

Embodiments that are described herein provide improved methods and circuits for domain crossing, i.e., for transferring data signals across clock or power domains. In some embodiments, a domain-crossing circuit is used for transferring a data signal from a first domain to a second domain of an IC or SoC. The domain-crossing circuit comprises transmit-side (T-side) circuitry belonging to the first domain, and receive-side (R-side) circuitry belonging to the second domain. The data signal is transferred via an asynchronous First-In First-Out (FIFO) buffer, which is written into by the T-side circuitry and read from by the R-side circuitry.

The T-side circuitry maintains a write pointer that tracks the writing position in the FIFO, and the R-side circuitry maintains a read pointer that tracks the readout position in the FIFO. The pointer values are transferred across the domain boundary between the T-side and R-side circuitry, for example in order to compare them and detect empty and full FIFO events.

In some embodiments, the T-side circuitry retains the write pointer value in a non-volatile element that is accessible to the R-side circuitry. Similarly, the R-side circuitry retains the read pointer value in a non-volatile element that is accessible to the T-side circuitry. In the context of the present disclosure and in the claims, the term "non-volatile element" refers to any component, or group of components, that retains the numerical value stored therein (e.g., pointer value) irrespective of reset, power down, change of power state and similar events. The non-volatile elements may comprise, for example, Flip-Flops (FFs) coupled to latch isolators, retention FFs, or other suitable components.

By retaining the pointer values in non-volatile elements as described above, the R-side circuitry has access to the correct write pointer value, regardless of whether the T-side circuitry is powered-up or powered-down, and regardless of whether the clock of the first domain is active or not. Similarly, the T-side circuitry has access to the correct read pointer value, irrespective of whether or not the R-side circuitry is active, and regardless of whether or not the clock of the second domain is active.

When using the disclosed technique, each of the first and second domains is free to reset or otherwise manage its power and clock states independently, without a need for coordination or consideration of the other domain. When resetting one domain, for example, there is no need to reset the other domain, and there is no need for ensuring that both domains are operational in order to perform synchronized reset.

Moreover, the disclosed techniques do not require special power-up or power-down sequences, and do not rely on any additional system assumptions, e.g., assumptions on the clock frequency ratio between domains. Furthermore, the disclosed solution does not involve transferring any clock signal between the domains, and therefore changes in the clock tree of one domain do not affect the other domain.

FIG. 1 is a block diagram that schematically illustrates a domain-crossing circuit 20, in accordance with an embodiment that is described herein. Circuit 20 is used for transferring a data signal from a first domain denoted A to a second domain denoted B. Domains A and B may correspond to different clock domains and/or different power domains. Domain-crossing circuit 20 may be implemented in any suitable circuit or system, such as in an IC or SoC.

In some embodiments, circuit 20 comprises a transmit-side (T-side) unit 24 in domain A, and a receive-side (R-side) unit 28 in domain B. The T-side unit and R-side unit are also referred to as T-side circuitry and R-side circuitry, respectively. Each of the T-side and R-side units is powered and clocked by the power and clock of its respective domain.

In the present example, T-side unit 24 comprises a First-In First-Out (FIFO) buffer memory 32, referred to herein simply as FIFO, for brevity. T-side unit 24 receives the data signal (denoted DATA IN in the figure) and writes the data signal into FIFO 32, in accordance with the clock of domain A.

T-side unit 24 maintains a write pointer 36 (denoted NxtWrPtr in the figure) that points to the next write position in FIFO 32. Unit 24 writes to the tail of FIFO 32, as indicated by NxtWrPtr, using a MUX 40. R-side unit 28 reads the data signal from FIFO 32, in accordance with the clock of domain B. The read data signal is transferred from domain A to domain B over a data interface 68, and provided as output denoted DATA OUT in the figure.

R-side unit 28 maintains a read pointer 42 (denoted NxtRdPtr in the figure) that points to the next readout position in FIFO 32. Unit 28 reads the head of FIFO 32, as indicated by NxtRdPtr, using a MUX 44. For this purpose, the read pointer value is transferred from domain B to domain A over a RdPtr interface 64.

In addition to the writing and readout process described above, domain-crossing circuit 20 comprises circuitry for detecting whether FIFO 32 is full or empty, to prevent writing into a full FIFO and readout from an empty FIFO. Typically, this protection mechanism is implemented by transferring each pointer value to the opposite domain and comparing it with the other pointer value. The pointer values are Gray-coded before transferring them between domains.

In the example of FIG. 1, T-side unit 24 converts the write pointer value NxtWrPtr into a Gray-coded representation using a Binary-to-Gray conversion module 48, and transfers the Gray-coded pointer value over a WrPTrGry interface 50 to R-side unit 28. In R-side unit 28, the Gray-coded pointer value is synchronized to the clock of domain B using a synchronizer 74B. After synchronization, R-side unit 28 converts the Gray-coded write pointer value back into binary representation using a Gray-to-Binary conversion module 52. R-side unit 28 comprise an empty-detection module (denoted "Empty" in the figure) that compares the write pointer value received from domain A with the locally generated read pointer value (NxtRdPtr). The comparison result (denoted ~VALID) is indicative of whether FIFO 32 is empty or not, and thus whether readout should be allowed or not.

In a similar manner, R-side unit 28 converts the read pointer value NxtRdPtr into a Gray-coded representation using a Binary-to-Gray conversion module 56, and transfers the Gray-coded pointer value over a RdPTrGry interface 58 to T-side unit 24. In T-side unit 24, the Gray-coded pointer value is synchronized to the clock of domain A using a synchronizer 74A. After synchronization, T-side unit 24 converts the Gray-coded read pointer value back into binary representation using a Gray-to-Binary conversion module 60. T-side unit 24 comprise a full-detection module (denoted "Full" in the figure) that compares the read pointer value received from domain B with the locally generated write pointer value (NxtWrPtr). The comparison result (denoted READY) is indicative of whether FIFO 32 is full or not, and thus whether writing should be allowed or not.

In an embodiment, T-side unit 24 can be reset using a reset signal denoted RESETNWr. An additional signal, denoted Wakeup WR, is used for distinguishing between normal reset of domain A and the first reset. This distinction enables T-side unit 24 the flexibility to decide whether or not to reset the write pointer value. Similarly, R-side unit 28 can be reset using a reset signal denoted RESETNRd. An additional signal, denoted Wakeup Rd, is used for distinguishing between normal reset of domain B and the first reset. This distinction enables R-side unit 28 the flexibility to decide whether or not to reset the read pointer value. Normal reset (as opposed to the first reset) is typically part of the power up/down sequence. Normal reset can typically occur independently on the T-side or R-side, whereas the first reset is typically required to occur on both sides together.

Independent Operation of Domains Using Non-Volatile Pointer Values

In some embodiments, T-side unit 24 retains the value of the Gray-coded write pointer (WrPtrGry) in a non-volatile element, which is accessible to R-side unit 28. In the present example, the non-volatile element comprises a Flip-Flop (FF) 70B followed by a latch isolator 78A. Latch isolator 78A latches the output of FF 70B, regardless of whether power is available or not in domain A, and regardless of resetting of domain A. As a result, the correct write pointer value can be read by synchronizer 74B of R-side unit 28 at all times, regardless of availability of clock and power in domain A. After reset or when power is restored in domain A, the value of FF 70B may be loaded from NxtWrPtr, which is in turn derived from a retention FF 70A (described below).

Similarly, R-side unit 28 retains the value of the Gray-coded read pointer (RdPtrGry) in a non-volatile element, which is accessible to T-side unit 24. In the present example, the non-volatile element comprises a FF 70C followed by a latch isolator 78B. Latch isolator 78B latches the output of FF 70C. As a result, the correct read pointer value can be read by synchronizer 74A of T-side unit 24, regardless of availability of clock and power in domain B. After reset or when power is restored in domain B, the value of FF 70C may be loaded from NxtRdPtr, which is in turn derived from a retention FF 70D (described below).

In an alternative embodiment, FF 70B may comprise a retention FF, i.e., a FIFO that holds its output stable while power is unavailable. In the latter embodiment, latch isolator 78A can be omitted. Similarly, in an alternative embodiment FF 70C may comprise a retention FF that also holds its output stable while power is unavailable. In this embodiment latch isolator 78B may be omitted. In other words, the non-volatile element in each domain may comprise a retention FF (of a type that holds its output stable while power down) instead of a FIFO followed by a latch isolator.

In addition, in some embodiments a retention FF 70A retains the value of write pointer NxtWrPtr in T-side unit 24, and a retention FF 70D retains the value of read pointer NxtRdPtr in R-side unit 28. Typically, FFs 70A and 70B in T-side unit 24 are reset on the first reset of domain A (a reset in which the Wakeup WR signal is asserted). Similarly, FFs 70C and 70D in R-side unit 28 are reset on the first reset of domain B (a reset in which the Wakeup Rd signal is asserted). Following reset, the values of the FFs are restored as described above, and circuit operation may resume using the correct pointer values without data loss.

By retaining the read and write pointer values in non-volatile elements that are accessible to the opposite domain, each side of the domain-crossing circuit is independent of the other. For example, T-side unit 24 is aware of the correct value of the read pointer even when R-side unit 28 is powered-down. As a result, T-side unit 24 is free to continue writing the data signal into FIFO 32 without the risk of overrunning the read pointer and over-filling the FIFO.

Similarly, R-side unit 28 is aware of the correct value of the write pointer regardless of any clock gating on the T-side or R-side. As a result, R-side unit 28 is free to continue reading the data signal from FIFO 32 without the risk of reading after the FIFO is empty. In the embodiment of FIG. 1, domain A should not be powered-down while FIFO 32 holds valid data. In an alternative embodiment, it is possible to retain the data in FIFO 32 during power unavailability in domain A, by constructing FIFO 32 from retention FFs (of a type that holds its output stable while power is unavailable), and retaining MUX 44 powered or moving it to the R-side.

When domains A and B are both operational (i.e., powered and clocked), T-side unit 24 and R-side unit 28 operate normally in transferring the data signal from domain A to domain B. Either domain may disable or enable its respective clock as desired, without a need for synchronization or coordination with the other domain. Such clock-state changes do not cause loss of data, but may merely introduce delay.

When powering-down either domain A or domain B, the following power-down sequence is typically used:
Assert reset signal.
Store pointer values in non-volatile elements.
Turn on clamps and/or isolations.
Close power switches.
When powering-up either domain A or domain B, the following power-down sequence is typically used:
Assert reset signal.
Open power switches.
Restore pointer values from non-volatile elements.
Remove clamps and/or isolations.

These power-down and power-up sequences are typically applied to other elements of the IC or SoC. In other words, domain-crossing circuit 20 does not impose any additional power-down or power-up sequence requirements.

Following power-down, the powered-down domain continues to present the correct pointer value to the other domain, as explained above, and the other domain may therefore continue operation. Following power-up, the pointer values of the powered-up domain are restored to their most recent values, and the domain may resume operation normally and without loss of data.

The disclosed implementation is also immune to changes in pointer values of the opposite domain during the power-down or power-up sequence, since the powered-down or powered-up domain ignores its interfaces while its reset is asserted, until the sequence is completed. In an embodiment, T-side unit 24 should not be powered-down when FIFO 32 is not empty. This condition, however, can be fulfilled locally in domain A and does not require any cross-domain protocol.

The configuration of circuit 20 shown in FIG. 1 is an example configuration, which is chosen purely for the sake of conceptual clarity. In alternative embodiments, any other suitable circuit configuration can be used. For example, the non-volatile elements that retain the pointer values may be implemented using any other suitable components, not necessarily using retention FFs of FFs coupled to latch isolators.

The different elements of circuit 20 may be implemented using suitable hardware, such as in an Application-Specific Integrated Circuit (ASIC) or Field-Programmable Programmable Gate Array (FPGA), or using discrete components. Elements of circuit 20 that are not mandatory for understanding of the disclosed techniques have been omitted from the figure for the sake of clarity.

Example Signal Scenarios

Figure 2:
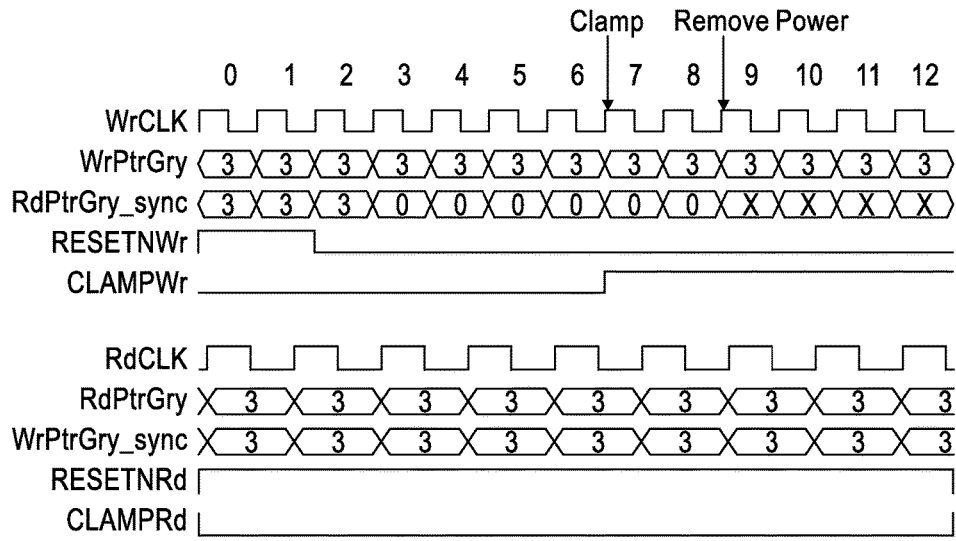
FIGS. 2-4 are signal diagrams that illustrate signals in the domain-crossing circuit of FIG. 1 under example power-down and power-up scenarios, in accordance with embodiments that are described herein.
Figure 3:
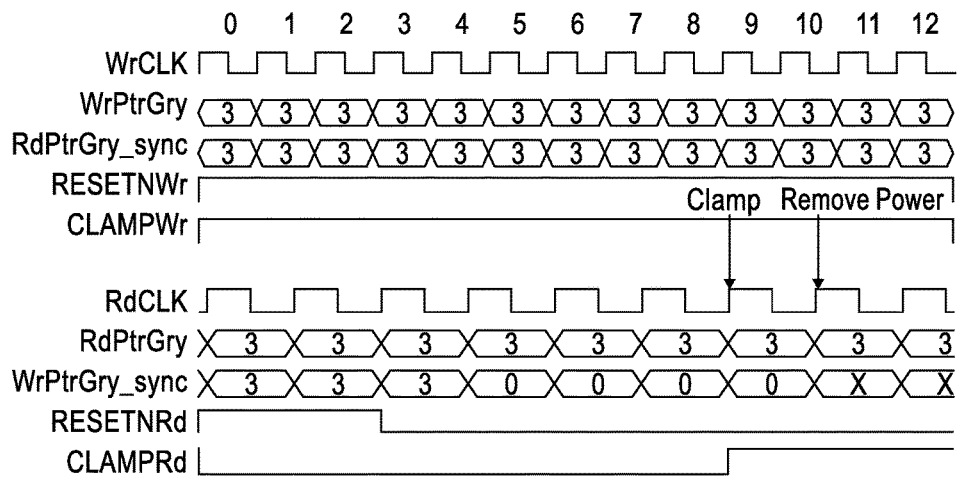
Figure 4:
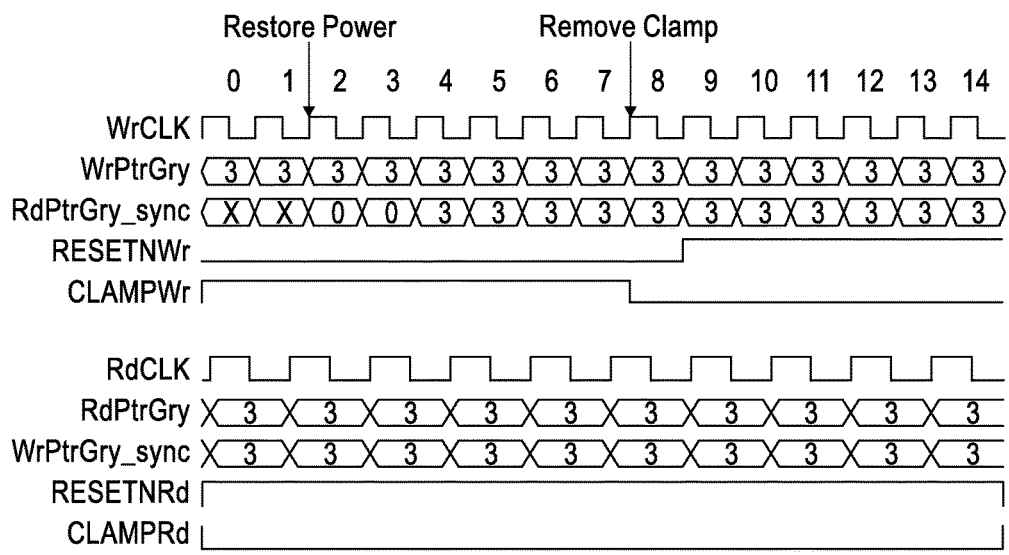

FIGS. 2-4 are signal diagrams that show the signals in domain-crossing circuit 20 under several example power-down and power-up scenarios, in accordance with embodiments that are described herein. In each figure, the signals in T-side unit 24 are shown at the top, and the signals in R-side unit 28 are shown at the bottom of the figure.

FIG. 2 illustrates powering-down of domain A (including T-side unit 24) while domain B (including R-side unit 28) is active. In this example, power-down is performed while FIFO 32 is empty (write pointer value WrPtrGry is equal to read pointer value RdPtrGry). As can be seen in the figure, during the entire sequence R-side unit 28 is presented with the same write pointer value, indicating that FIFO 32 is empty and there is no data signal to be read.

FIG. 3 illustrates powering-down of domain B (including R-side unit 28) while domain A (including T-side unit 24) is active. In this example, T-side unit 24 may continue writing normally, until FIFO 32 becomes full. The write pointer value WrPtrGry may advance, while the read pointe value RdPtrGry presented by R-side unit is static. When R-side unit 28 wakes-up, it is presented with the correct write pointer value and increments the pointer accordingly without skipping data.

FIG. 4 illustrates powering-up of domain A (including T-side unit 24) while domain B (including R-side unit 28) is active.

It will thus be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An electronic circuit, comprising:
   transmit-side circuitry, which belongs to a first domain of the circuit and is configured to transmit a data signal from the first domain to a second domain of the circuit; and
   receive-side circuitry, which belongs to the second domain and is configured to receive the transmitted data signal,
   wherein the receive-side circuitry is configured to:
      transfer to the transmit-side circuitry a read pointer value indicative of a readout position in a buffer memory that buffers the data signal; and
      retain the read pointer value in a non-volatile element comprising a flip-flop followed by a latch isolator, wherein the latch isolator retains an output of the flip-flop while the flip-flop is not powered by electrical power, making the output of the flip-flop accessible to the transmit-side circuitry even while the receive-side circuitry is not powered by electrical power,
   and wherein the transmit-side circuitry is configured to retrieve the read pointer value from the non-volatile element while the receive-side circuitry is not powered by electrical power, and to transmit the data signal based on the retrieved read pointer value.

2. The circuit according to claim 1, wherein the read pointer value is accessible to the transmit-side circuitry regardless of whether the receive-side circuitry is active or inactive.

3. The circuit according to claim 1, wherein the transmit-side circuitry is configured to write the data signal to the buffer memory while the receive-side circuitry is inactive.

4. The circuit according to claim 1, wherein the transmit-side circuitry is configured to verify, using the read pointer value retained in the non-volatile element of the receive-side circuitry, that the buffer memory is not full.

5. The circuit according to claim 1, wherein the transmit-side circuitry is configured to transfer to the receive-side circuitry a write pointer value indicative of a writing position in the buffer memory, and to retain the write pointer value in a second non-volatile element that is accessible to the receive-side circuitry.

6. The circuit according to claim 5, wherein the write pointer value is accessible to the receive-side circuitry regardless of whether the transmit-side circuitry is active or inactive.

7. The circuit according to claim 5, wherein the receive-side circuitry is configured to read the data signal from the buffer memory while the transmit-side circuitry is inactive.

8. The circuit according to claim 5, wherein the receive-side circuitry is configured to verify, using the write pointer value retained in the second non-volatile element of the transmit-side circuitry, that the buffer memory is not empty.

9. The circuit according to claim 5, wherein the non-volatile element and the second non-volatile element each comprises a Flip-Flop (FF) coupled to a latch isolator, or a retention FF.

10. The circuit according to claim 1, wherein the first and second domains comprise respective different clock domains of the circuit.

11. The circuit according to claim 10, wherein no clock signal is transferred between the transmit-side circuitry and the receive-side circuitry.

12. The circuit according to claim 1, wherein the first and second domains comprise respective different power domains of the circuit.

13. A method, comprising:
   transmitting a data signal from a first domain to a second domain of a circuit using transmit-side circuitry belonging to a first domain;
   receiving the transmitted data signal using receive-side circuitry belonging to the second domain;
   transferring from the receive-side circuitry to the transmit-side circuitry a read pointer value indicative of a readout position in a buffer memory that buffers the data signal;
   retaining the read pointer value in the receive-side circuitry in a non-volatile element comprising a flip-flop followed by a latch isolator, wherein the latch isolator retains an output of the flip-flop while the flip-flop is not powered by electrical power, making the output of the flip-flop accessible to the transmit-side circuitry even while the receive-side circuitry is not powered by electrical power; and
   while the receive-side circuitry is not powered by electrical power, retrieving the read pointer value from the non-volatile element by the transmit-side circuitry, and transmitting the data signal based on the retrieved read pointer value.

14. The method according to claim 13, wherein the read pointer value is accessible to the transmit-side circuitry regardless of whether the receive-side circuitry is active or inactive.

15. The method according to claim 13, wherein transmitting the data signal comprises verifying by the transmit-side circuitry, using the read pointer value retained in the non-volatile element of the receive-side circuitry, that the buffer memory is not full.

16. The method according to claim 13, and comprising transferring from the transmit-side circuitry to the receive-side circuitry a write pointer value indicative of a writing position in the buffer memory, and retaining the write pointer value in the transmit-side circuitry in a second non-volatile element that is accessible to the receive-side circuitry.

17. The method according to claim 16, wherein the write pointer value is accessible to the receive-side circuitry regardless of whether the transmit-side circuitry is active or inactive.

18. The method according to claim 16, wherein reading the data signal comprises verifying by the receive-side circuitry, using the write pointer value retained in the second non-volatile element of the transmit-side circuitry, that the buffer memory is not empty.

19. The method according to claim 16, wherein the non-volatile element and the second non-volatile element each comprises a Flip-Flop (FF) coupled to a latch isolator, or a retention FF.

20. The method according to claim 13, wherein the first and second domains comprise respective different clock or power domains of the circuit.

\* \* \* \* \*